United States Patent
Hyatt et al.

(10) Patent No.: US 8,074,543 B2
(45) Date of Patent: Dec. 13, 2011

(54) MACHINE TOOL WITH COOLING NOZZLE AND METHOD FOR APPLYING COOLING FLUID

(75) Inventors: Gregory Hyatt, South Barrington, IL (US); Abhijit Sahasrabudhe, Wheeling, IL (US)

(73) Assignee: Mori Seiki USA, Inc., Rolling Meadows, IL (US)

( * ) Notice: Subject to any disclaimer, the term of this patent is extended or adjusted under 35 U.S.C. 154(b) by 238 days.

(21) Appl. No.: 12/040,602

(22) Filed: Feb. 29, 2008

(65) Prior Publication Data

US 2008/0219781 A1    Sep. 11, 2008

Related U.S. Application Data

(60) Provisional application No. 60/892,502, filed on Mar. 1, 2007.

(51) Int. Cl.
*B23B 3/22* (2006.01)
(52) U.S. Cl. ............................................ 82/121; 82/120
(58) Field of Classification Search .................. 82/118, 82/120, 121, 129, 159; 407/11; 29/28
See application file for complete search history.

(56) References Cited

U.S. PATENT DOCUMENTS

| | | | | |
|---|---|---|---|---|
| 2,834,376 A | * | 5/1958 | Hughes | 137/625.11 |
| 3,726,363 A | * | 4/1973 | Sussman | 184/39.1 |
| 4,006,518 A | * | 2/1977 | Rudolph et al. | 29/39 |
| 4,008,631 A | * | 2/1977 | Hahn et al. | 82/1.11 |
| 4,164,879 A | * | 8/1979 | Martin | 82/158 |
| 4,314,425 A | | 2/1982 | Bricker et al. | |
| 4,524,655 A | * | 6/1985 | Waldron et al. | 82/159 |
| 4,643,056 A | * | 2/1987 | Arehart et al. | 82/159 |
| 4,719,676 A | * | 1/1988 | Sansone | 29/27 A |
| 4,929,130 A | | 5/1990 | Diebolt et al. | |
| 5,160,086 A | | 11/1992 | Kuykendal et al. | |
| 5,190,421 A | * | 3/1993 | Wen et al. | 408/56 |
| 5,213,260 A | | 5/1993 | Tonkinson | |
| 5,265,505 A | * | 11/1993 | Frechette | 82/159 |
| 5,421,072 A | * | 6/1995 | Kuban | 29/38 A |
| 5,535,496 A | * | 7/1996 | Sugino et al. | 29/39 |
| 5,664,470 A | * | 9/1997 | Garnett et al. | 82/121 |

(Continued)

FOREIGN PATENT DOCUMENTS

DE    20319125 U1 *  5/2004

(Continued)

OTHER PUBLICATIONS

International Preliminary Report on Patentability from PCT/US2008/055624 dated Sep. 1, 2009, 7 pages.

*Primary Examiner* — Kenneth E. Peterson
*Assistant Examiner* — Jennifer Swinney
(74) *Attorney, Agent, or Firm* — Miller, Matthias & Hull LLP

(57) ABSTRACT

Disclosed in one embodiment is a computer numerically controlled machine having a coolant nozzle that is mounted on a turret of the machine and that is rotatable relative to the turret under the control of a computer control system. The nozzle is fluidically connected to a source of a coolant. The machine includes a computer control system that is operatively coupled to the various components of the machine including the nozzle. In some embodiments, the nozzle may be moved to cause a constant contact angle with respect to one of said tool and said workpiece. In other embodiments, the nozzle may be moved to cause a constant coolant time to interface. Also disclosed are related methods.

6 Claims, 14 Drawing Sheets

U.S. PATENT DOCUMENTS

| | | | |
|---|---|---|---|
| 5,730,691 A * | 3/1998 | Tokura et al. | 483/56 |
| 5,862,833 A * | 1/1999 | Perez | 137/625.11 |
| 5,916,013 A | 6/1999 | Naumann et al. | |
| 6,179,692 B1 * | 1/2001 | Hara | 451/53 |
| 6,302,004 B1 * | 10/2001 | Taylor | 82/1.11 |
| 6,386,948 B1 | 5/2002 | Kondo | |
| 6,416,394 B1 | 7/2002 | Hacikyan et al. | |
| 6,425,715 B1 * | 7/2002 | Sasanecki | 408/56 |
| 6,471,146 B1 | 10/2002 | Kuykendal et al. | |
| 6,471,583 B1 | 10/2002 | Kondo | |
| 6,539,827 B2 * | 4/2003 | Yamaji et al. | 82/1.11 |
| 6,666,748 B2 | 12/2003 | Hiramoto et al. | |
| 6,715,971 B2 | 4/2004 | Curtis | |
| 6,772,042 B1 | 8/2004 | Warren et al. | |
| 6,789,299 B1 * | 9/2004 | Kidder | 29/39 |
| 7,014,528 B2 | 3/2006 | Mizutani et al. | |
| 7,021,994 B2 | 4/2006 | Ahti et al. | |
| 7,025,543 B2 | 4/2006 | Curtis | |
| 7,039,992 B2 * | 5/2006 | Tokuma et al. | 29/27 C |
| 7,044,840 B2 | 5/2006 | Yoshimi et al. | |
| 7,086,930 B2 | 8/2006 | Webster | |
| 7,101,256 B2 | 9/2006 | Sudo | |
| 7,153,187 B2 | 12/2006 | Ahti et al. | |
| 7,264,538 B2 | 9/2007 | Hood et al. | |
| 2002/0073810 A1 * | 6/2002 | Sasanecki | 82/1.11 |
| 2004/0079207 A1 * | 4/2004 | Matsumura et al. | 82/158 |
| 2006/0252356 A1 | 11/2006 | Webster | |
| 2008/0066592 A1 * | 3/2008 | Yamane et al. | 82/121 |

FOREIGN PATENT DOCUMENTS

| | | | |
|---|---|---|---|
| EP | 1004396 | | 5/2000 |
| EP | 12008940 | | 5/2002 |
| EP | 1700670 | | 9/2006 |
| FR | 2735058 | * | 12/1996 |
| JP | 63318239 A | * | 12/1988 |
| JP | 02255206 A | * | 10/1990 |
| JP | 3-92244 | * | 4/1991 |
| JP | 04279260 A | * | 10/1992 |
| JP | 7-276814 | * | 10/1995 |
| JP | 08257807 | * | 10/1996 |
| WO | 02072299 | | 9/2002 |

* cited by examiner

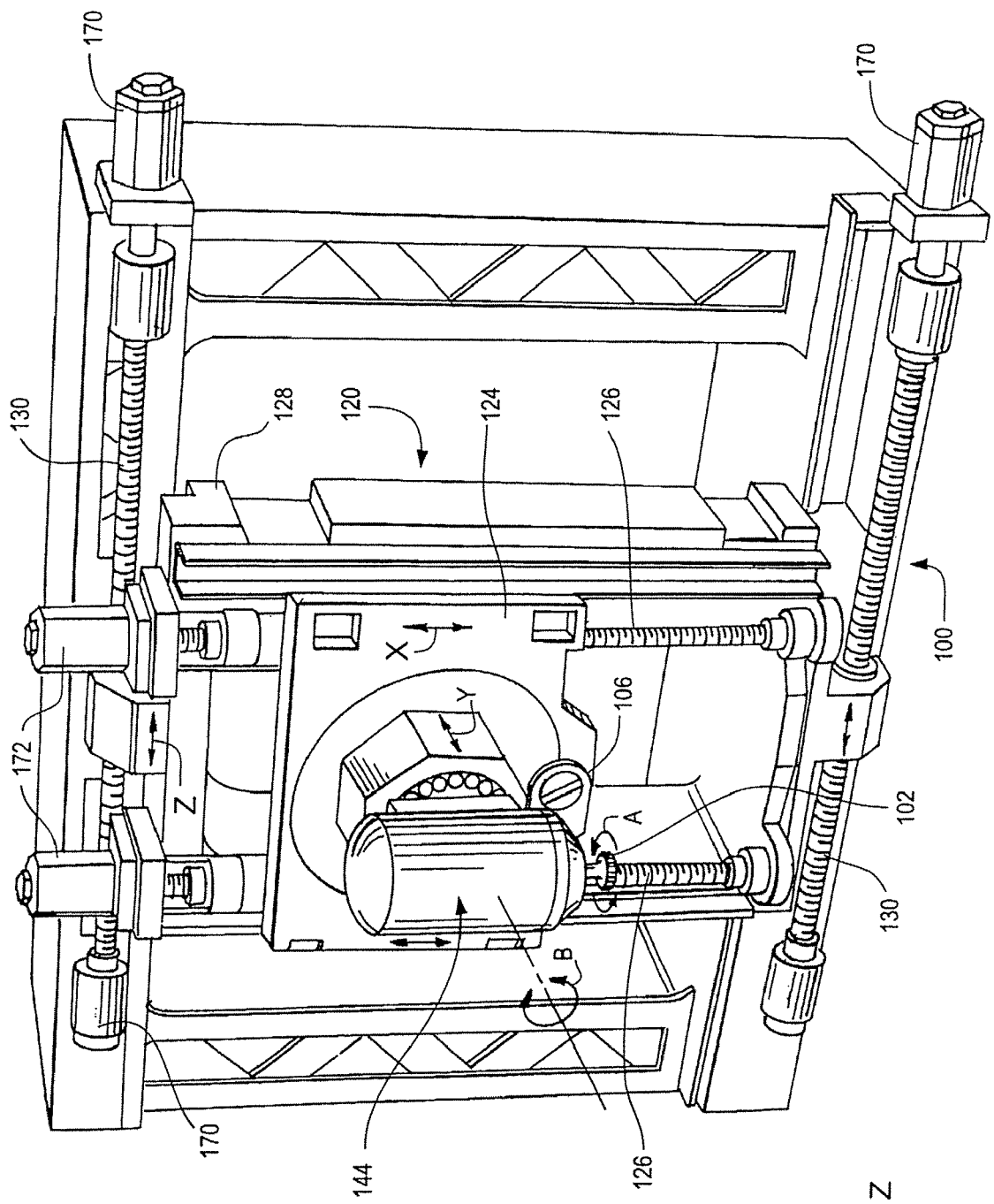
Fig. 4
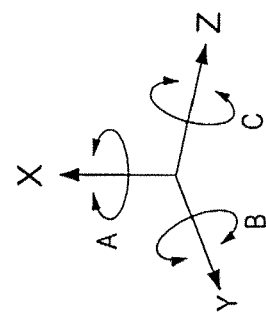

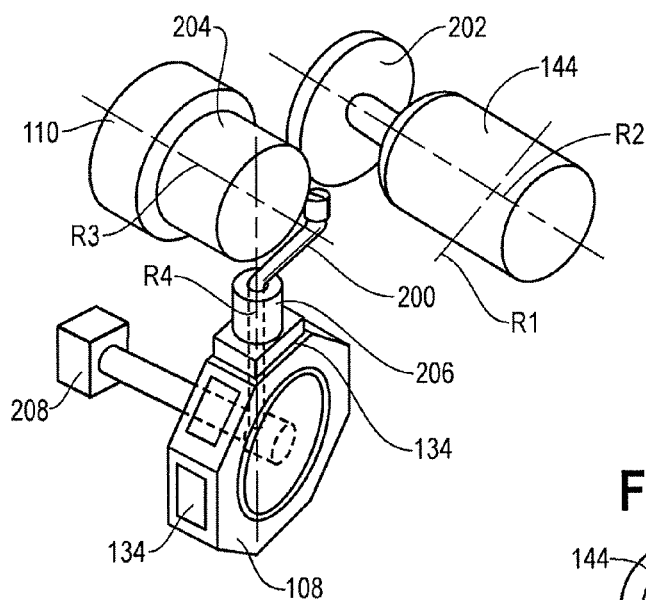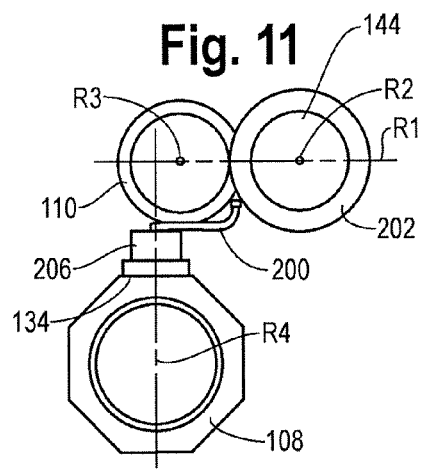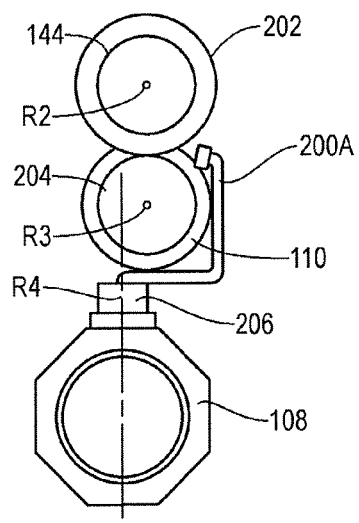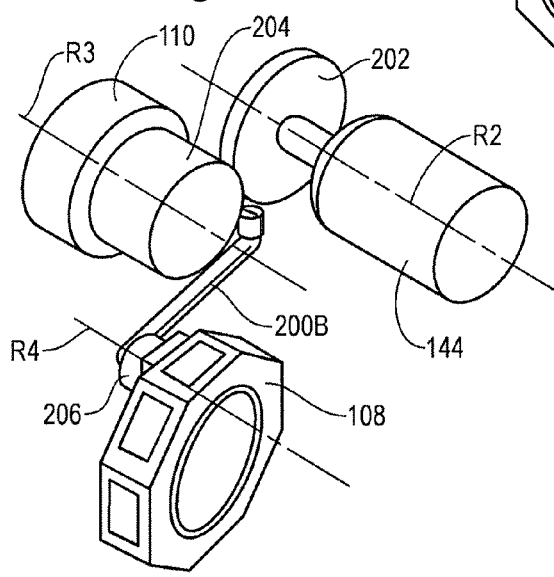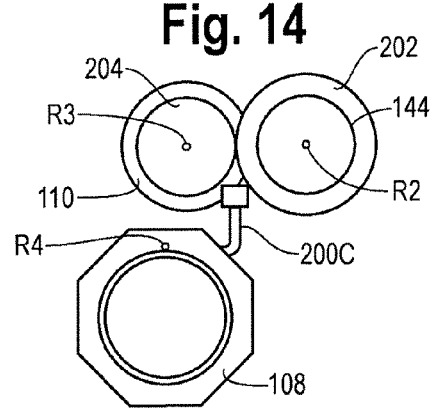

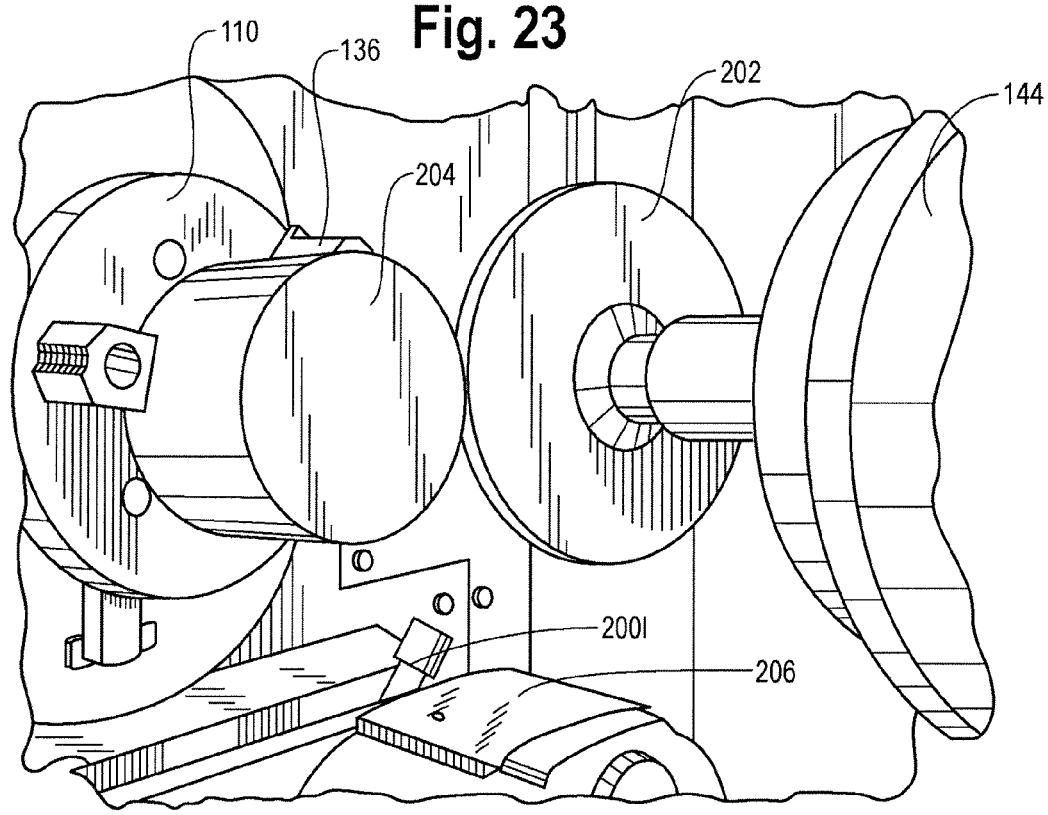
Fig. 23
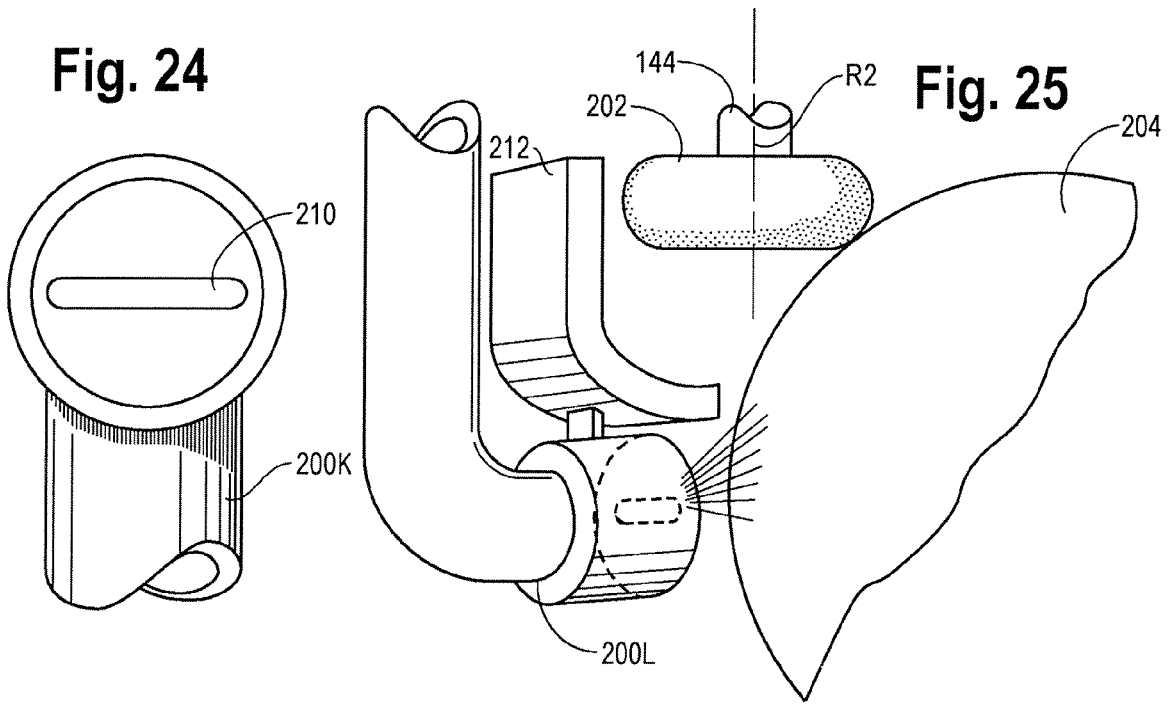
Fig. 24
Fig. 25

MACHINE TOOL WITH COOLING NOZZLE AND METHOD FOR APPLYING COOLING FLUID

RELATED APPLICATION

This application claims the benefit of prior provisional application Ser. No. 60/892,502 filed Mar. 1, 2007. The entire contents of the prior provisional application are hereby incorporated by reference.

TECHNICAL FIELD OF THE INVENTION

The invention is in the field of computer numerically controlled machines. Various embodiments of the invention are in the field of coolant delivery within a computer numerically controlled machine

BACKGROUND

Coolant is supplied in computer numerically controlled machines for various purposes. Typically, the coolant, which is an oil, an aqueous emulsion, or other liquid, is introduced under pressure via a nozzle. Grinding operations in general require adequate coolant at the point of contact between workpiece and the grinding wheel. In such operations, coolant typically is directed under pressure at the grinding wheel or workpiece or at the point of contact between the workpiece and wheel. The workpiece may itself be a cutting tool that is reground in the grinding operation or may be a functional part. In other operations, such as milling, coolant likewise may be applied to the workpiece or the tool, or applied at the tool-workpiece interface (point of contact). Also, the cooling fluid may be applied during or after a machine operation as a cleaning spray to wash away swarf.

The prior art has provided machines that include coolant nozzles, which, in many cases, are proximate the chuck of the machine tool. With typical coolant nozzle placement, it can be difficult to control and properly direct the coolant. This can cause difficulties. For instance, in a grinding operation it is typical for the coolant to be applied to the grinding wheel, which spins and which tends to throw off the coolant via centrifugal forces. It is sometimes desirable to maintain a constant time to interface, or time between the initial contact of the coolant with the grinding wheel and the time the coolant on the wheel reaches the interface between the wheel and workpiece. The grinding wheel often erodes during a grinding operation, and the ground dimension of the workpiece can decrease, thus requiring adjustment to the coolant nozzle if a constant time-to-interface is desired. In other circumstances, it may be desirable to maintain a constant contact angle, or rotational angle between the point of contact of the coolant on the workpiece or tool and the point of contact at the workpiece interface. Again, it can be difficult to maintain a constant contact angle, particularly if the size of the tool or of the workpiece changes, or as the position of the workpiece is varied.

U.S. Pat. Nos. 6,772,042 B1 (assigned to Dimensional Control, Inc.) and 6,666,748 B2 (assigned to Makino Milling Machines Co., Ltd.) purport to provide servo-controlled programmable coolant nozzles that are used to direct coolant to grinding wheel. The heretofore described servo-controlled coolant nozzle and programmable coolant nozzle of the prior art require special machine modifications. Generally, it is desired to provide in some embodiments a coolant nozzle arrangement and in some embodiments a method that differs from the foregoing.

SUMMARY OF THE INVENTION

The invention provides in one embodiment a machine having a turret and a coolant nozzle that is mounted on the turret in a rotary fashion on a facet of the turret, generally under the control of a computer control system. The turret typically may be rotated to expose different facets, and the coolant nozzle may be installed on one of the facets and rotated out of functional position when not in use. The coolant nozzle may comprise a nozzle and a device for rotating the nozzle. The turret typically is moveable in linear X and Z directions, and possibly in a Y direction, thus permitting the cooling nozzle to be translated and rotated to various positions. The coolant nozzle is fluidically coupled to a source of cooling fluid by which coolant may be introduced under pressure through the nozzle.

The coolant nozzle may be moved relative to the workpiece or tool as the workpiece and tool move with respect to one another. In some embodiments, a constant coolant contact angle with respect to the wheel and workpiece may be maintained. In other embodiments, a constant time to interface for the coolant may be maintained. The constant time to interface embodiments are deemed particularly (but nor exclusively) suitable for so-called "viper" (very impressive performance extreme removal) grinding. As discussed in more detail in U.S. Pat. No. 6,123,606, viper grinding is characterized by employing a grinding wheel, typically a porous grinding wheel, that is brought to bear on a workpiece to cause a high rate of removal of workpiece material. Coolant is sprayed onto the grinding wheel, typically at high pressures (1000 psi is conventional) relative to coolant pressures employed in other machine operations. Coolant is typically absorbed by the porous grinding wheel to enable cooling of the wheel and workpiece and the coolant generally serves to clean the wheel. Viper grinding is deemed useful for materials that are difficult to machine, such as many titanium- and nickel-based materials. U.S. Pat. No. 6,123,606 is hereby incorporated by reference in its entirety for its disclosure of a grinding operation.

In alternative embodiments, the grinding wheel is mounted on a tool spindle of the machine, with a coolant nozzle mounted on a grinding wheel guard. The spindle may be translated and rotated about an axis that is perpendicular to the axis of rotation of the spindle and grinding wheel.

The invention also provides a method whereby the coolant nozzle may be moved relative to the workpiece or tool as the workpiece and tool move with respect to one another. In some embodiments the nozzle moves with respect to the axis of rotation of the grinding wheel. In other embodiments, the nozzle is stationary with respect to the axis of rotation of the grinding wheel. For instance, the nozzle may be mounted on a guard of the grinding wheel.

In various embodiments, the invention likewise encompasses an apparatus that includes one of the structures heretofore described and a computer control system with a computer-readable medium having computer-readable code disposed thereon that, when executed, is configured to cause movement of the nozzle.

DESCRIPTION OF THE DRAWINGS

FIG. 4 a perspective view, enlarged with respect to FIG. 3 illustrating the machining spindle and the horizontally and vertically disposed rails via which the spindle may be translated;

FIG. 10 is a front elevation of a computer numerically controlled machine illustrating a turret-mounted coolant nozzle in accordance with one embodiment of the invention.

FIG. 11 is a side elevation of the computer numerically controlled machine showing FIG. 10.

FIG. 12 is a side elevation of a computer numerically controlled machine, showing an alternative embodiment of a coolant nozzle.

FIG. 13 is a front elevation of a computer numerically controlled machine having another alternative coolant nozzle.

FIG. 14 is a side elevation of the machine shown FIG. 13.

FIG. 23 is a perspective view of a computer numerically controlled machine illustrating the coolant nozzle shown in FIG. 20 in an outside diameter rough grinding operation.

FIG. 24 is a perspective view of the end of a nozzle in accordance with one embodiment of the invention.

FIG. 25 is a representation of a machining operation where the nozzle is mounted on a guard of a grinding wheel and is thus stationary relative to the axis of rotation of the grinding wheel, but wherein a constant time to interface is achieved by moving the nozzle and workpiece relative to one another.

DETAILED DESCRIPTION

Any suitable apparatus may be employed in conjunction with the methods of invention. In some embodiments, the methods are performed using a computer numerically controlled machine, illustrated generally in FIGS. 1-9. A computer numerically controlled machine is itself provided in other embodiments of the invention. The machine 100 illustrated in FIGS. 1-9 is an NT-series machine, versions of which are available from Mori Seiki USA, Inc., the assignee of the present application. Other suitable computer numerically controlled machines include the NL-series machines with turret (not shown), also available from Mori Seiki USA, Inc. Other machines may be used in conjunction with the invention, including the NZ, NH, NV, and NMV machines, also available from Mori Seiki USA, Inc.

Figure 1:
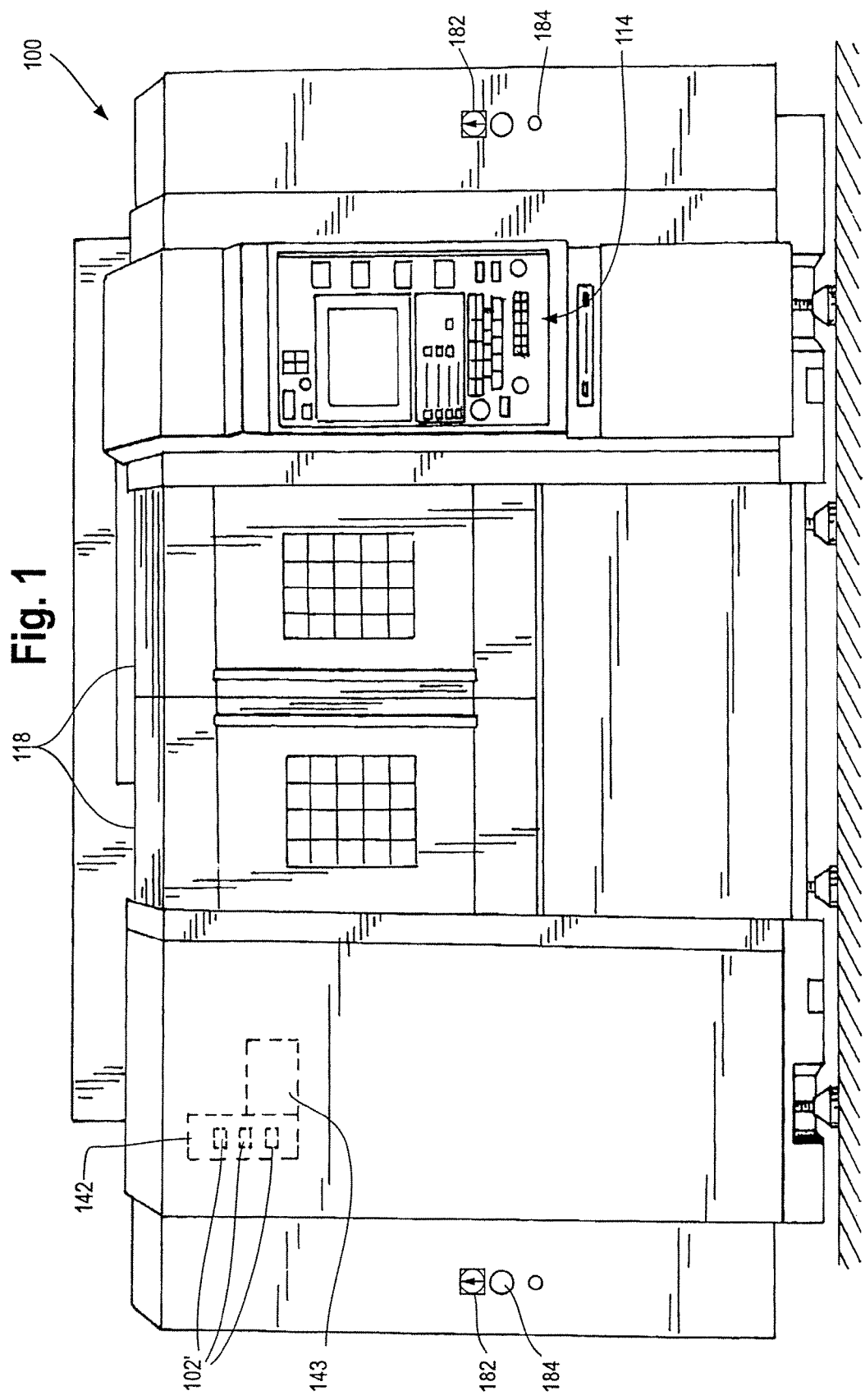
FIG. 1 is a front elevation view of a computer numerically controlled machine in accordance with one embodiment of the present invention, shown with safety doors closed.
Figure 2:
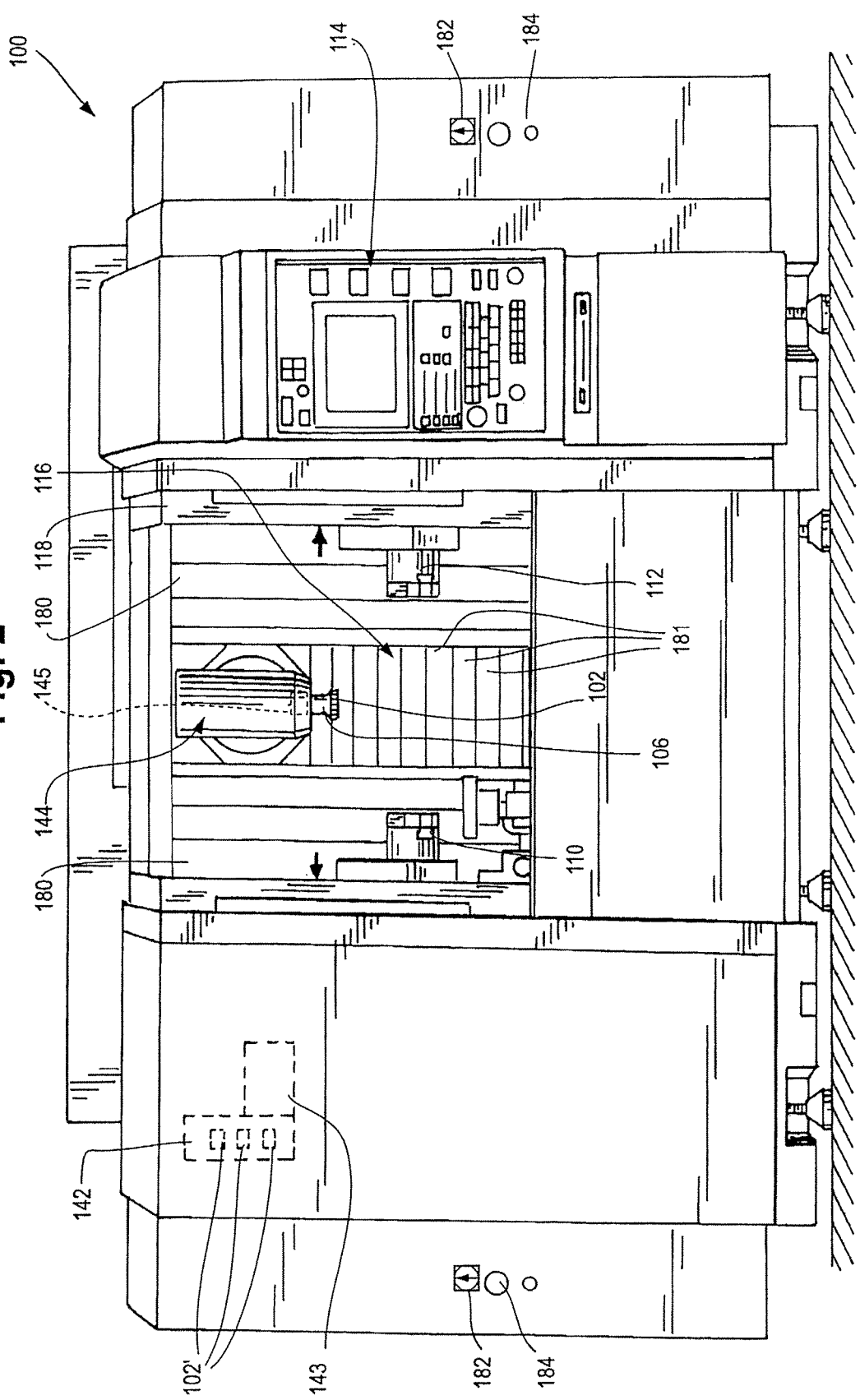
FIG. 2 is a front elevation view of a computer numerically controlled machine illustrated in FIG. 1, shown with the safety doors open.
Figure 3:
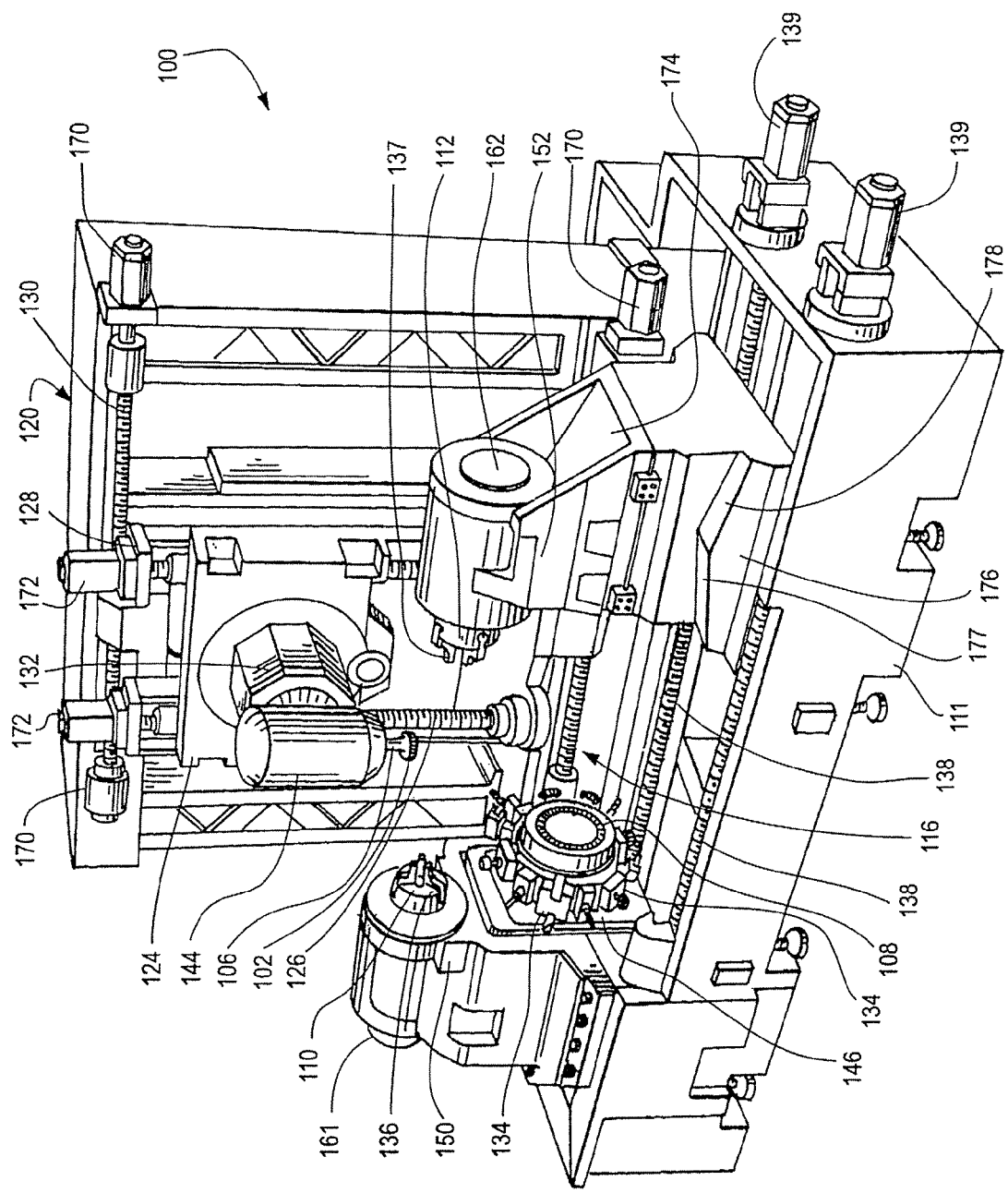
FIG. 3 is a perspective view of certain interior components of the computer numerically controlled machine illustrated in FIGS. 1 and 2, depicting a machining spindle, a first chuck, a second chuck, and a turret.

In general, with reference to the NT-series machine illustrated in FIGS. 1-3, one suitable computer numerically controlled machine 100 has at least a first retainer and a second retainer, each of which may be one of a spindle retainer associated with spindle 144, a turret retainer associated with a turret 108, or a chuck 110, 112. In the embodiment illustrated in the Figures, the computer numerically controlled machine 100 is provided with a spindle 144, a turret 108, a first chuck 110, and a second chuck 112. The computer numerically controlled machine 100 also has a computer control system operatively coupled to the first retainer and to the second retainer for controlling the retainers, as described in more detail below. It is understood that in some embodiments, the computer numerically controlled machine 100 may not contain all of the above components, and in other embodiments, the computer numerically controlled machine 100 may contain additional components beyond those designated herein.

As shown in FIGS. 1 and 2, the computer numerically controlled machine 100 has a machine chamber 116 in which various operations generally take place upon a workpiece (not shown). Each of the spindle 144, the turret 108, the first chuck 110, and the second chuck 112 may be completely or partially located within the machine chamber 116. In the embodiment shown, two moveable safety doors 118 separate the user from the chamber 116 to prevent injury to the user or interference in the operation of the computer numerically controlled machine 100. The safety doors 118 can be opened to permit access to the chamber 116 as illustrated in FIG. 2. The computer numerically controlled machine 100 is described herein with respect to three orthogonally oriented linear axes (X, Y, and Z), depicted in FIG. 4 and described in greater detail below. Rotational axes about the X, Y and Z axes are connoted "A," "B," and "C" rotational axes respectively.

The computer numerically controlled machine 100 is provided with a computer control system for controlling the various instrumentalities within the computer numerically controlled machine. In the illustrated embodiment, the machine is provided with two interlinked computer systems, a first computer system comprising a user interface system (shown generally at 114 in FIG. 1) and a second computer system (not illustrated) operatively connected to the first computer system. The second computer system directly controls the operations of the spindle, the turret, and the other instrumentalities of the machine, while the user interface system 114 allows an operator to control the second computer system. Collectively, the machine control system and the user interface system, together with the various mechanisms for control of operations in the machine, may be considered a single computer control system. In some embodiments, the user operates the user interface system to impart programming to the machine; in other embodiments, programs can be loaded or transferred into the machine via external sources. It is contemplated, for instance, that programs may be loaded via a PCMCIA interface, an RS-232 interface, a universal serial bus interface (USB), or a network interface, in particular a TCP/IP network interface. In other embodiments, a machine may be controlled via conventional PLC (programmable logic controller) mechanisms (not illustrated).

As further illustrated in FIGS. 1 and 2, the computer numerically computer controlled machine 100 may have a tool magazine 142 and a tool changing device 143. These cooperate with the spindle 144 to permit the spindle to operate with plural cutting tools (shown in FIG. 1 as tools 102'). Generally, a variety of cutting tools may be provided; in some embodiments, plural tools of the same type may be provided.

The spindle 144 is mounted on a carriage assembly 120 that allows for translational movement along the X- and Z-axes, and on a ram 132 that allows the spindle 144 to be moved in the Y-axis. The ram 132 is equipped with a motor to allow rotation of the spindle in the B-axis, as set forth in more detail hereinbelow. As illustrated, the carriage assembly has a first carriage 124 that rides along two threaded vertical rails (one rail shown at 126) to cause the first carriage 124 and spindle 144 to translate in the X-axis. The carriage assembly also includes a second carriage 128 that rides along two horizontally disposed threaded rails (one shown in FIG. 3 at 130) to allow movement of the second carriage 128 and spindle 144 in the Z-axis. Each carriage 124, 128 engages the rails via plural ball screw devices whereby rotation of the rails 126, 130 causes translation of the carriage in the X- or Z-direction respectively. The rails are equipped with motors 170 and 172 for the horizontally disposed and vertically disposed rails respectively.

The spindle 144 holds the cutting tool 102 by way of a spindle connection and a tool holder 106. The spindle connection 145 (shown in FIG. 2) is connected to the spindle 144 and is contained within the spindle 144. The tool holder 106 is connected to the spindle connection 145 and holds the cutting tool 102. Various types of spindle connections are known in the art and can be used with the computer numerically controlled machine 100. Typically, the spindle connection 145 is contained within the spindle 144 for the life of the spindle. An access plate 122 for the spindle 144 is shown in FIGS. 5 and 6.

The first chuck 110 is provided with jaws 136 and is disposed in a stock 150 that is stationary with respect to the base 111 of the computer numerically controlled machine 100. The second chuck 112 is also provided with jaws 137, but the second chuck 112 is movable with respect to the base 111 of the computer numerically controlled machine 100. More specifically, the machine 100 is provided with threaded rails 138 and motors 139 for causing translation in the Z-direction of the second stock 152 via a ball screw mechanism as heretofore described. To assist in swarf removal, the stock 152 is provided with a sloped distal surface 174 and a side frame 176 with Z-sloped surfaces 177, 178. Hydraulic controls and associated indicators for the chucks 110, 112 may be provided, such as the pressure gauges 182 and control knobs 184 shown in FIGS. 1 and 2. Each stock is provided with a motor (161, 162 respectively) for causing rotation of the chuck.

Figure 5:
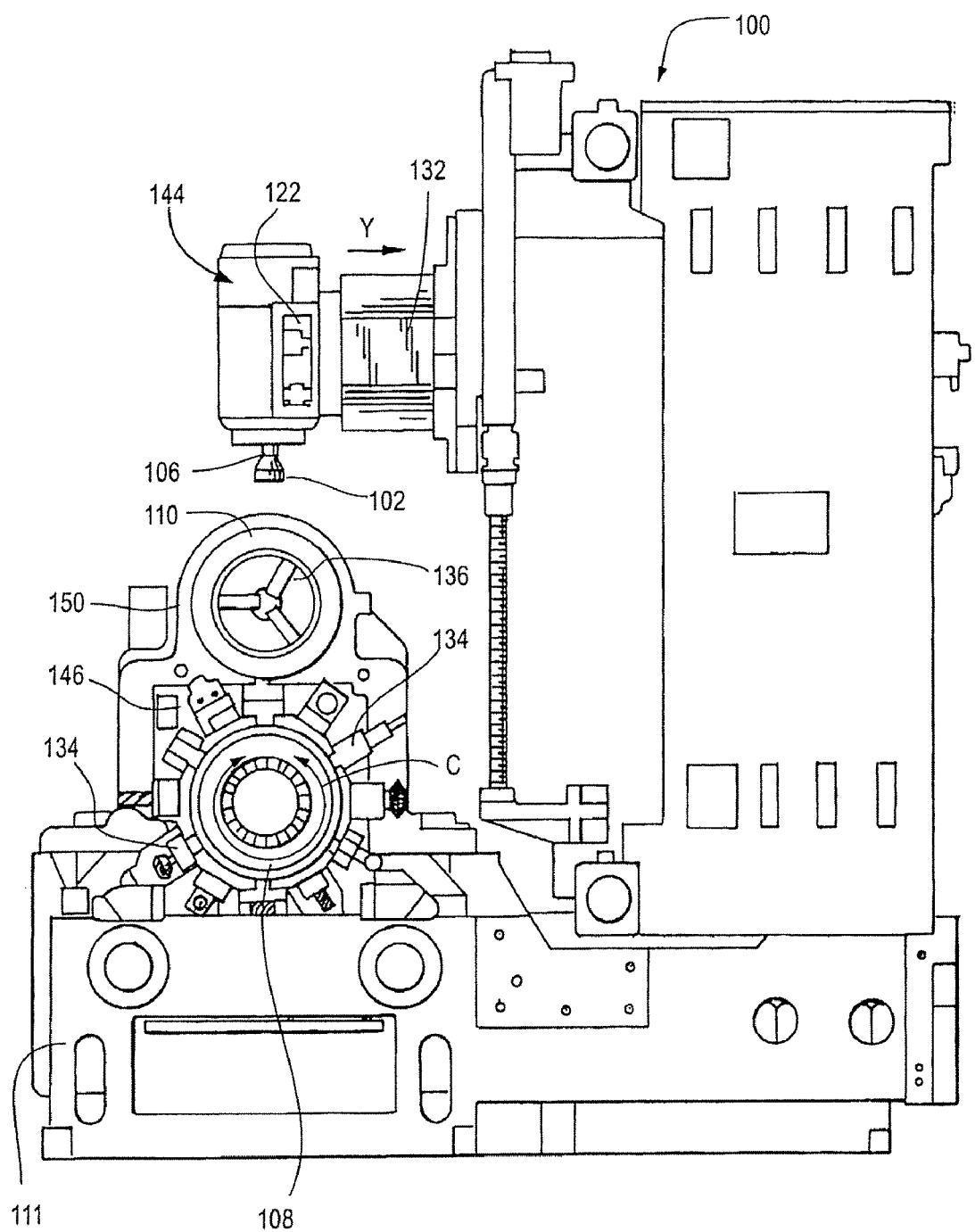
FIG. 5 is a side view of the first chuck, machining spindle, and turret of the machining center illustrated in FIG. 1.
Figure 6:
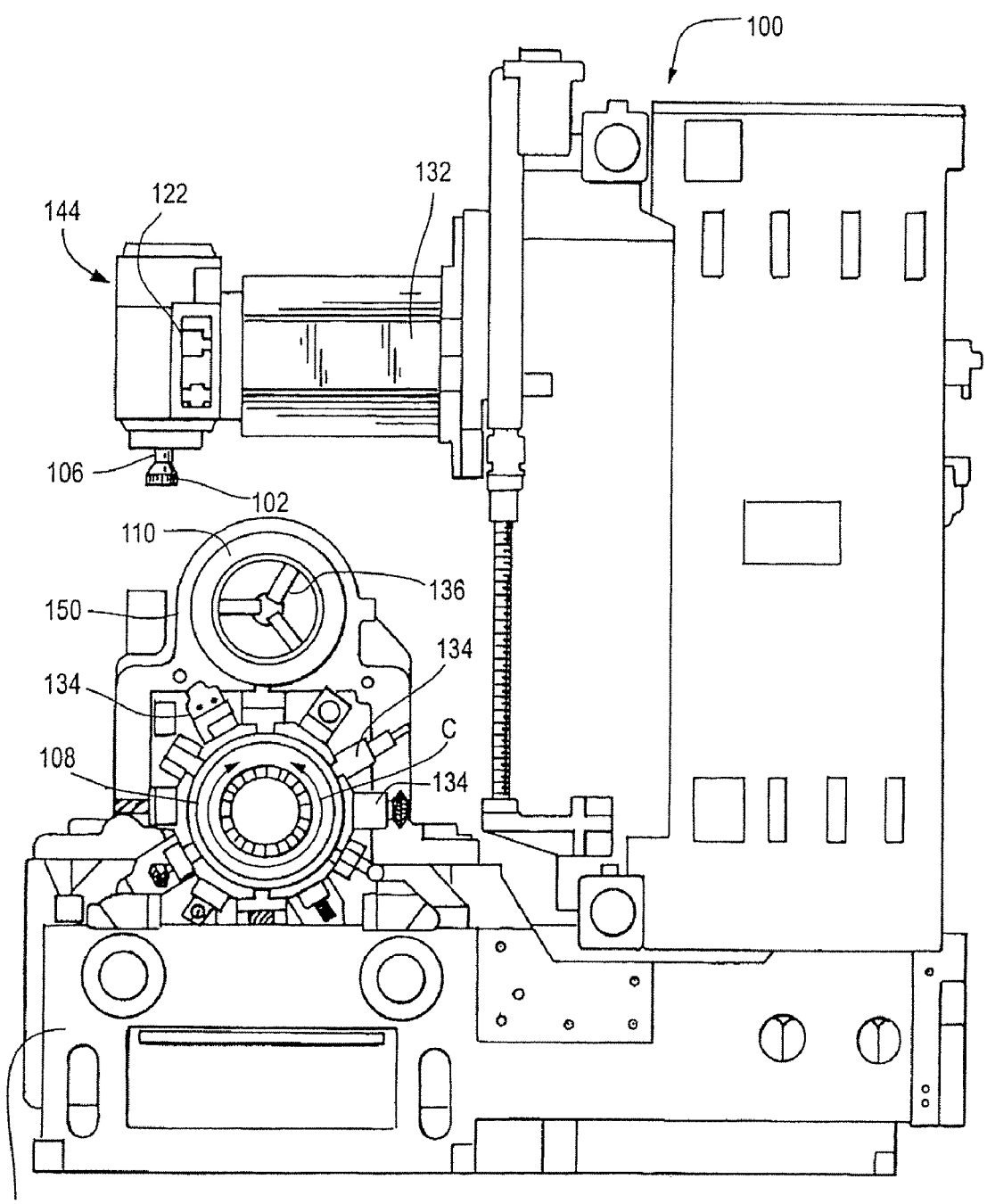
FIG. 6 is a view similar to FIG. 5 but in which a machining spindle has been translated in the Y-axis.
Figure 9:
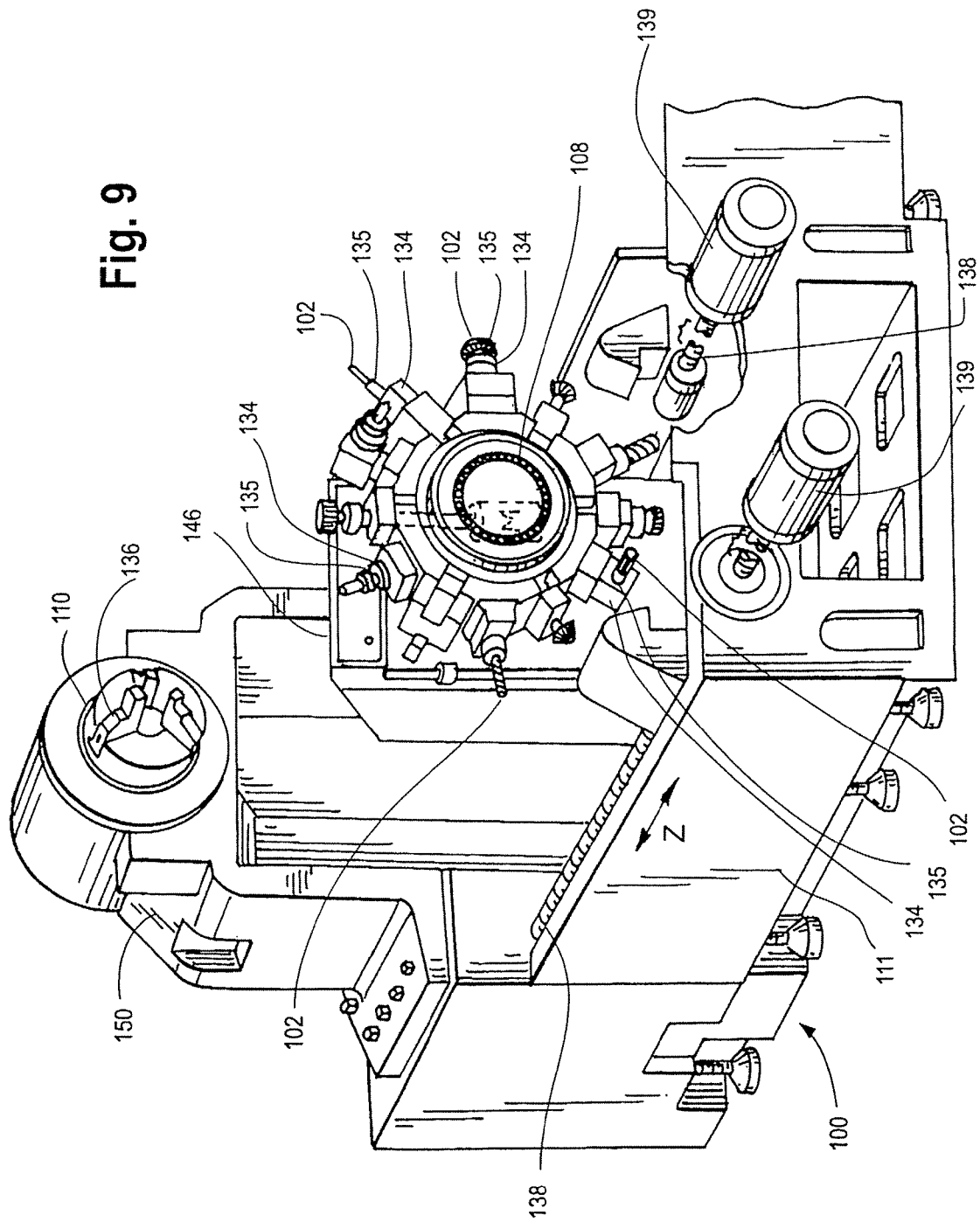
FIG. 9 is a perspective view of the first chuck and turret illustrated in FIG. 2, depicting movement of the turret and turret stock in the Z-axis relative to the position of the turret in FIG. 2.

The turret 108, which is best depicted in FIGS. 5, 6 and 9, is mounted in a turret stock 146 (FIG. 5) that also engages rails 138 and that may be translated in a Z-direction, again via ball-screw devices. The turret 108 is provided with various turret connectors or facets 134, as illustrated in FIG. 9. Each turret connector 134 can be connected to a tool holder 135 or other connection for connecting to a cutting tool. Since the turret 108 can have a variety of turret connectors 134 and tool holders 135, a variety of different cutting tools can be held and operated by the turret 108. The turret 108 may be rotated in a C axis to present different ones of the tool holders (and hence, in many embodiments, different tools) to a workpiece.

Figure 7:
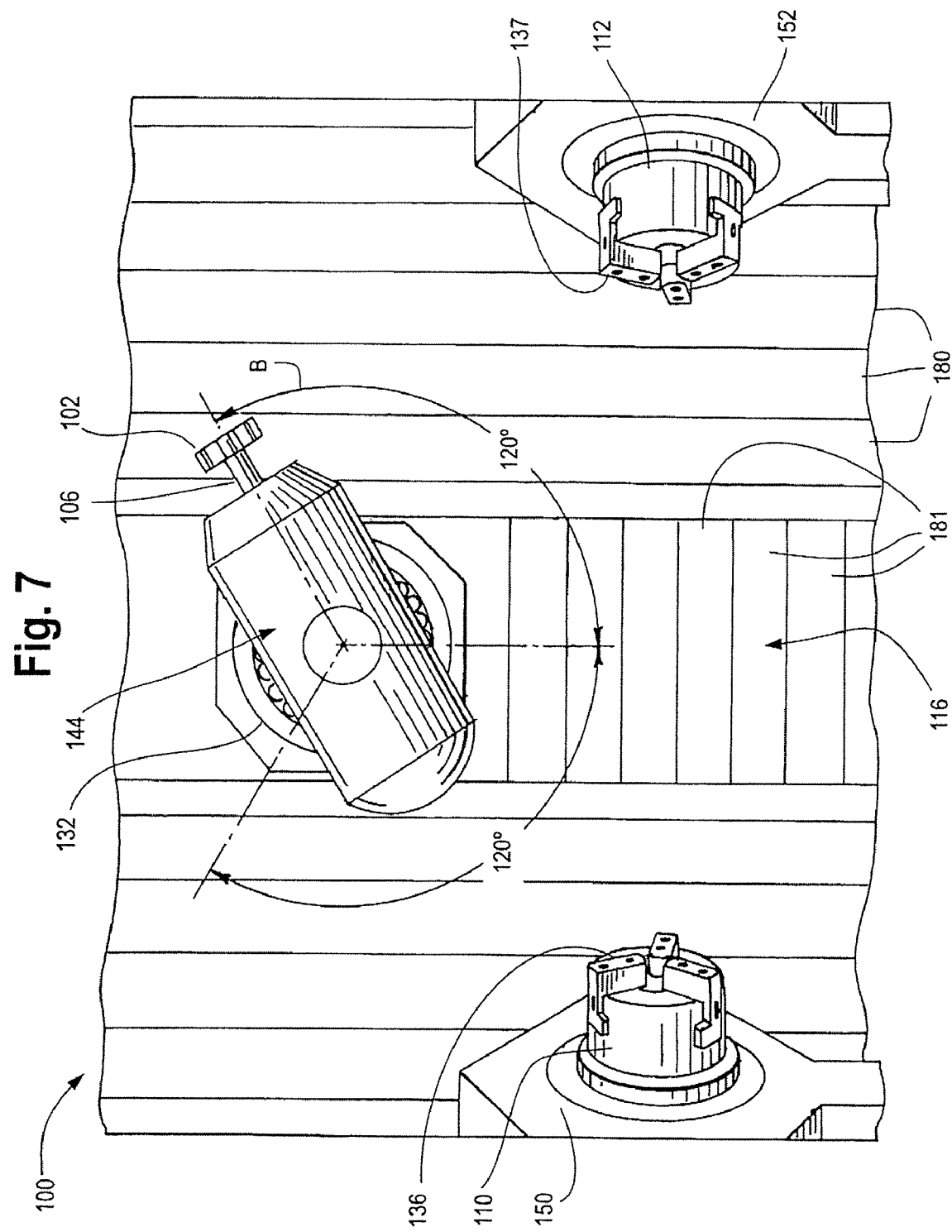
FIG. 7 is a front view of the spindle, first chuck, and second chuck of the computer numerically controlled machine illustrated in FIG. 1, including a line depicting the permitted path of rotational movement of this spindle.
Figure 8:
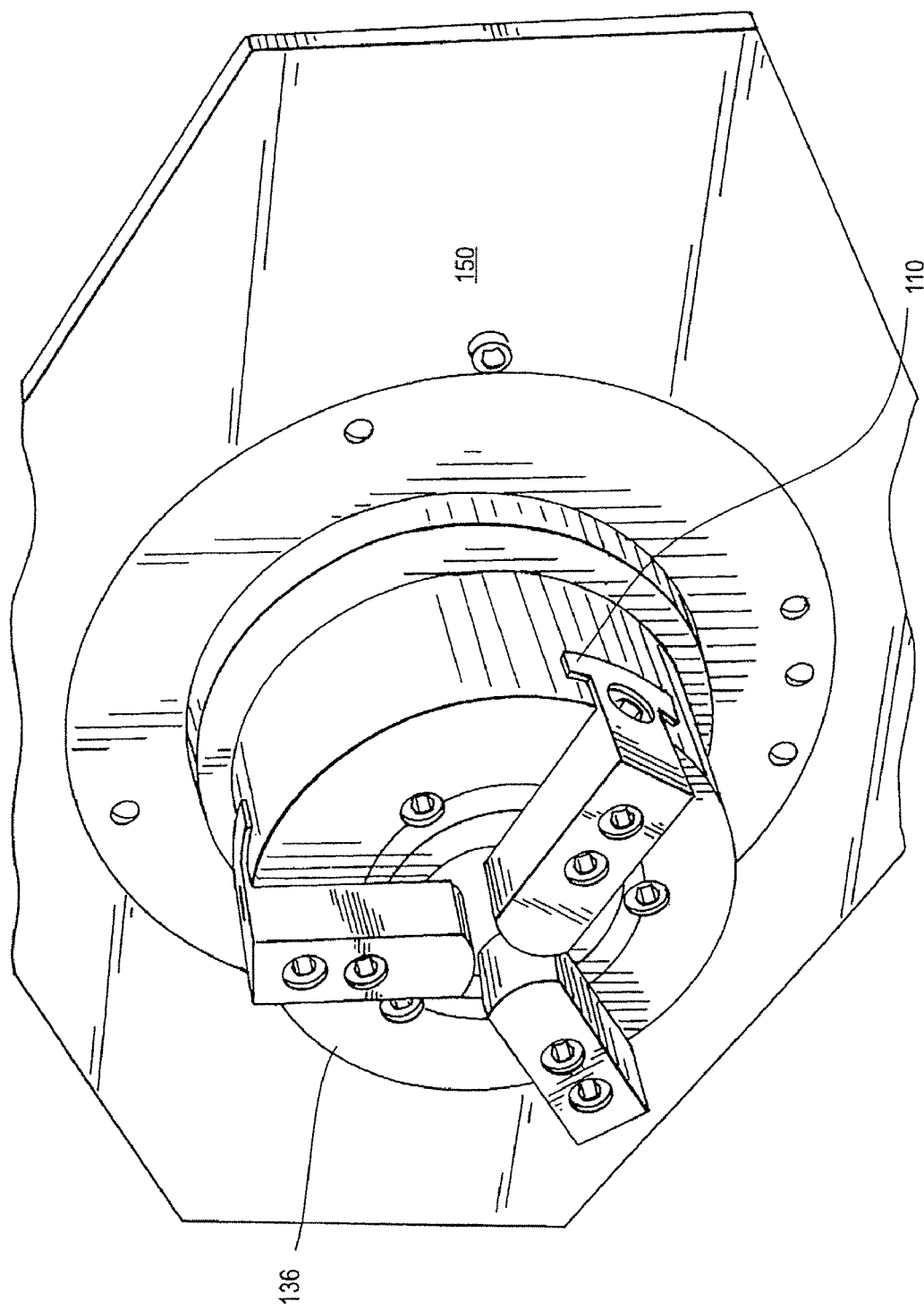
FIG. 8 is a perspective view of the second chuck illustrated in FIG. 3, enlarged with respect to FIG. 3.

It is thus seen that a wide range of versatile operations may be performed. With reference to tool 102 held in tool holder 106, such tool 102 may be brought to bear against a workpiece (not shown) held by one or both of chucks 110, 112. When it is necessary or desirable to change the tool 102, a replacement tool 102 may be retrieved from the tool magazine 142 by means of the tool changing device 143. With reference to FIGS. 4 and 5, the spindle 144 may be translated in the X and Z directions (shown in FIG. 4) and Y direction (shown in FIGS. 5 and 6). Rotation in the B-axis is depicted in FIG. 7, the illustrated embodiment permitting rotation within a range of 120° to either side of the vertical. Movement in the Y direction and rotation in the B axis are powered by motors (not shown) that are located behind the carriage 124. Generally, as seen in FIGS. 2 and 7, the machine is provided with a plurality of vertically disposed leaves 180 and horizontal disposed leaves 181 to define a wall of the chamber 116 and to prevent swarf from exiting this chamber.

The components of the machine 100 are not limited to the heretofore described components. For instance, in some instances an additional turret may be provided. In other instances, additional chucks and/or spindles may be provided. Generally, the machine is provided with one or more mechanisms for introducing a cooling liquid into the chamber 116.

In the illustrated embodiment, the computer numerically controlled machine 100 is provided with numerous retainers. Chuck 110 in combination with jaws 136 forms a retainer, as does chuck 112 in combination with jaws 137. In many instances these retainers will also be used to hold a workpiece. For instance, the chucks and associated stocks will function in a lathe-like manner as the headstock and optional tailstock for a rotating workpiece. Spindle 144 and spindle connection 145 form another retainer. Similarly, the turret 108, when equipped with plural turret connectors 134, provides a plurality of retainers (shown in FIG. 9).

The computer numerically controlled machine 100 may use any of a number of different types of cutting tools known in the art or otherwise found to be suitable. For instance, the cutting tool 102 may be a milling tool, a drilling tool, a grinding tool, a blade tool, a broaching tool, a turning tool, or any other type of cutting tool deemed appropriate in connection with a computer numerically controlled machine 100. As discussed above, the computer numerically controlled machine 100 may be provided with more than one type of cutting tool, and via the mechanisms of the tool changing device 143 and magazine 142, the spindle 144 may be caused to exchange one tool for another. Similarly, the turret 108 may be provided with one or more cutting tools 102, and the operator may switch between cutting tools 102 by causing rotation of the turret 108 to bring a new turret connector 134 into the appropriate position.

Other features of a computer numerically controlled machine include, for instance, an air blower for clearance and removal of chips, various cameras, tool calibrating devices, probes, probe receivers, and lighting features. The computer numerically controlled machine illustrated in FIGS. 1-9 is not the only machine of the invention, but to the contrary, other embodiments are envisioned.

With reference to FIG. 10, the turret 108 includes a programmable coolant nozzle 200, which is more clearly seen in FIG. 11. A spindle 144 includes a tool, such as a grinding wheel 202 that, in the illustrated embodiment, is performing a grinding operation on a workpiece 204 that is mounted in a side chuck 110. The spindle 144 may be rotated about an axis R1 that is perpendicular to the axis of rotation R2 of the wheel 202 when the turret 108 is in a fixed position relative to a base of the machine. The coolant nozzle 200 in the illustrated embodiment is mounted in a rotary holder 206 that is operatively coupled to a motor, and which may be similar to tool holders 135. The rotary holder 206 is capable of rotating the nozzle 200 about an axis of rotation R4 which, in the embodiment of FIGS. 10-11, is perpendicular to the axes of rotation R1, R2, R3 of the spindle 144, the wheel 202, and the workpiece 204, respectively. The motor is coupled to the computer control system of the machine. The motor may be internal to the turret 108 or may be external to the turret 108. The nozzle 200 is fluidically coupled to a source 208 of cooling fluid, whereby, under the control of the computer control system, fluid may selectively be delivered under pressure to the nozzle 200. The source 208 may include pumping and filtering equipment, as well as other known components. The rotary holder 206 may be a conventionally driven rotary driven holder that includes a keyed arbor that engages a corresponding structure (not shown) within the turret 108. In some embodiments a nozzle may be disposed on a conventional nonrotary holder.

Figure 16:
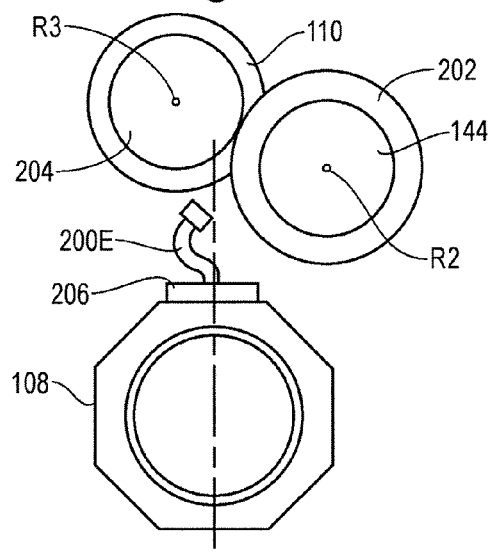
FIG. 16 shows a curved coolant nozzle, without a rotary tool holder, mounted on the turret for grinding.

As illustrated in FIGS. 12-14, the coolant nozzle may take different forms. For instance, as shown in FIG. 12, the coolant nozzle tool may be an angled nozzle tool 200A. In this embodiment, the nozzle 200A is disposed at an oblique angle relative to the axis of rotation R3 of the turret 108. As shown in FIGS. 13-14, the tool alternatively may be a right-angle nozzle tool 200B, and may be mounted on the side of the turret 108. In each of these embodiments, the nozzle is mounted on a rotary tool holder 206 and is thereby rotatable independently of the rotation of the turret 108. In the embodiment of FIGS. 13-14, the rotary holders 206 are configured to rotate the nozzles 200B, 200C on an axis of rotation R4 that is parallel to the axes of rotation R2, R3 of the wheel 202 and workpiece 204, respectively. In a further embodiment, as shown in FIG. 16, the nozzle 200E may be curved.

The machine tool 100 preferably is a numerically controlled machine tool 100 in which the turret 108 may be translated in the X and Z directions as is conventional using conventional programming techniques. Preferably, the chuck 110 likewise may be translated along axes perpendicular to the axis of rotation R4 of the workpiece 204. It is thus seen that a great degree of flexibility in the positioning of the nozzle 200 relative to the grinding wheel 202 and workpiece 204 may be achieved. In some embodiments, the turret 108 may be movable in a Y-direction as well.

Figure 15:
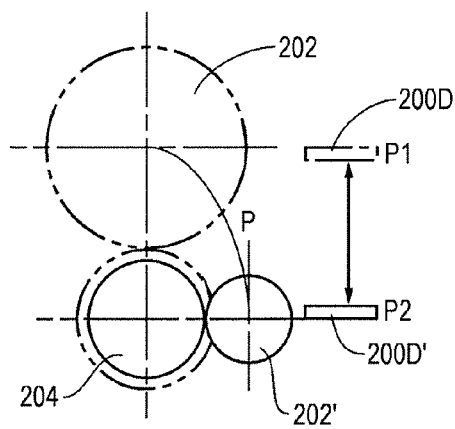
FIG. 15 is a representation of a side view of a machine showing motion of a grinding wheel and of the coolant nozzle tool as the wheel decreases with diameter during the grinding operation so as to maintain constant time to interface.

As shown in FIG. 15, during the grinding operation, the grinding wheel 202 typically will become reduced in diameter to a reduced diameter (wheel 202' representing the wheel 202 after reduction in diameter). The speed of revolution of the grinding wheel 202 has been increased by 100% to maintain the surface velocity of the wheel. By moving the grinding wheel 202 relative to the workpiece, as shown via path P, and by moving the coolant nozzle 200D from position P1 to position P2 (indicated by 200D'), a constant coolant time to interface with respect to the grinding wheel 202 thus may be maintained. The constant time to interface may be maintained within the limits of the machine. The coolant angle changes from 90 degrees (shown with the nozzle in position P1) to 180 degrees (in position P2) but the diameter of the wheel has been reduced by 50%, and thus the time to interface remains the same.

Various modifications of the above may be made. For instance, the wheel 202 and workpiece 204 are shown as having the form of right circular cylinders, but other forms are possible.

The position of the coolant nozzle will be controlled by the X- and Z-direction motion of the turret 108, and then the nozzle is rotatable to control the rotary position of the nozzle. The nozzle may be mounted in a conventional tool holder that permits 360° rotation, such as tool holders 135 of the turret 108 depicted in FIG. 9. The coolant nozzle can direct the coolant either at a contact point between the work piece 204 and the grinding wheel 202 or directly on the grinding wheel 202 for continuous viper grinding.

Figure 17:
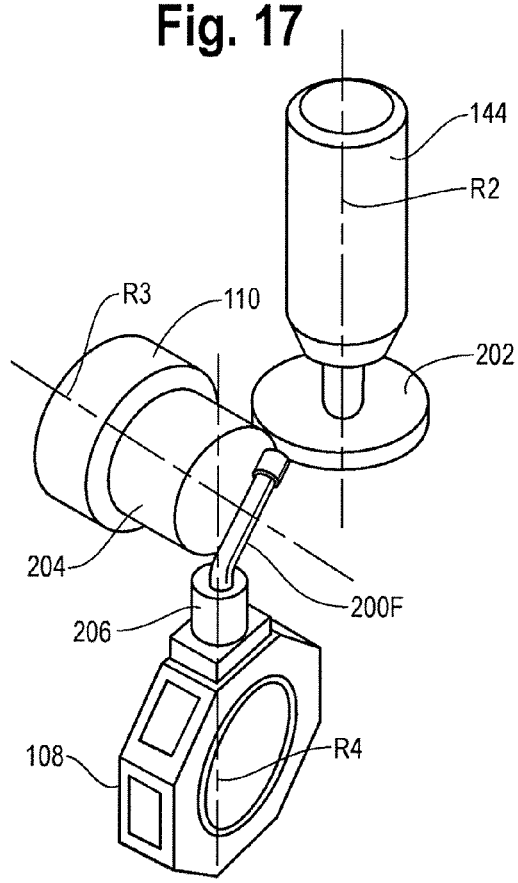
FIG. 17 is a front view.
Figure 18:
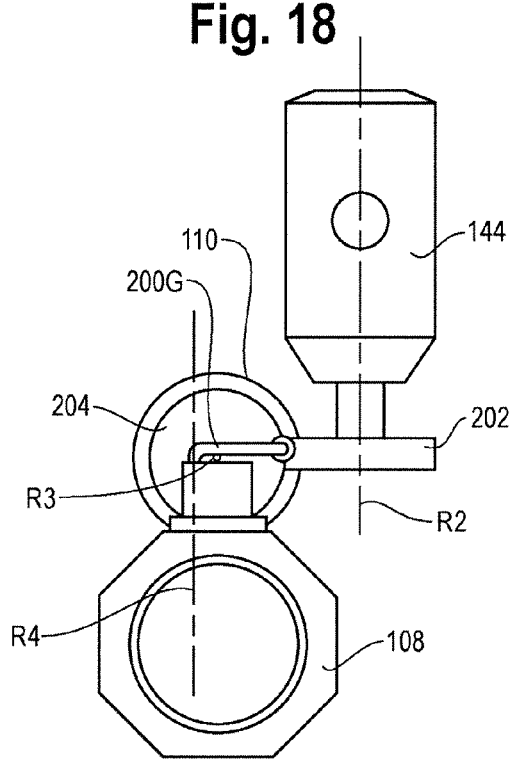
FIG. 18 is a side view, of a coolant nozzle, without a rotary tool holder, mounted on the turret for grinding, with the axis of rotation of the perpendicular to the control axis of to the work piece.

FIGS. 17 and 18 show other possible orientations in which a coolant nozzles 200F, 200G are mounted on the turret 108 so as to direct coolant for continuous viper grinding.

Figure 19:
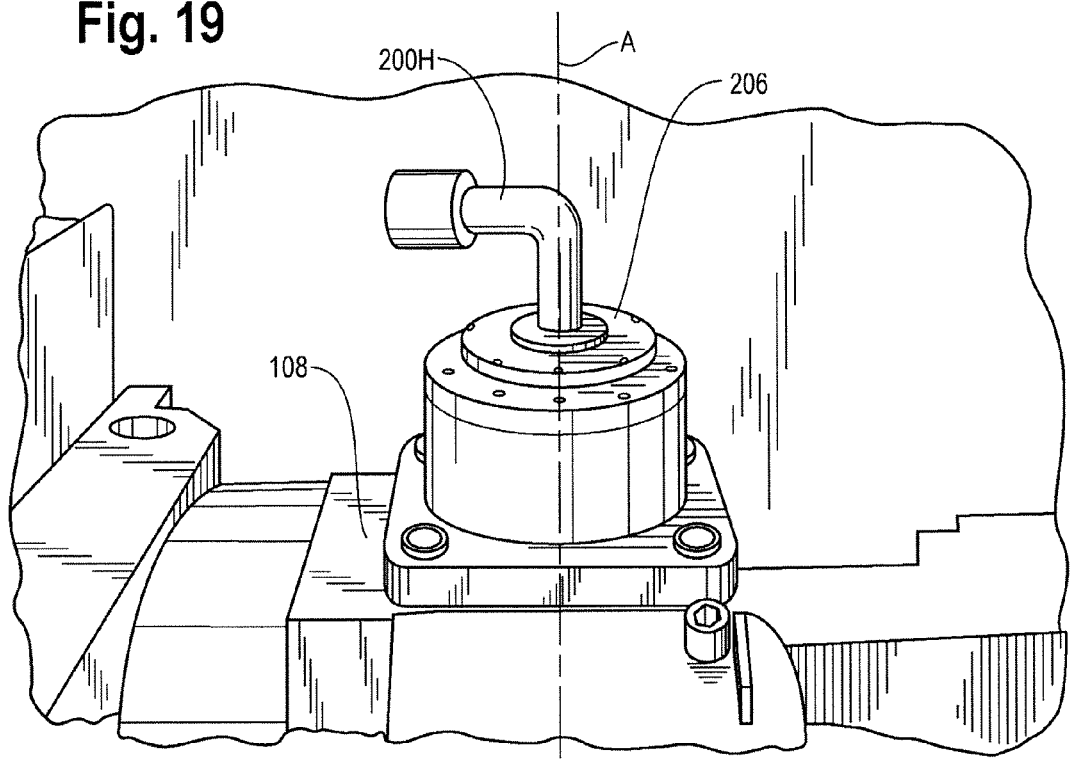
FIG. 19 is a perspective view of an embodiment of a coolant nozzle, illustrating a coolant nozzle in a rotary tool holder, the nozzle being rotatable in an A-axis.
Figure 20:
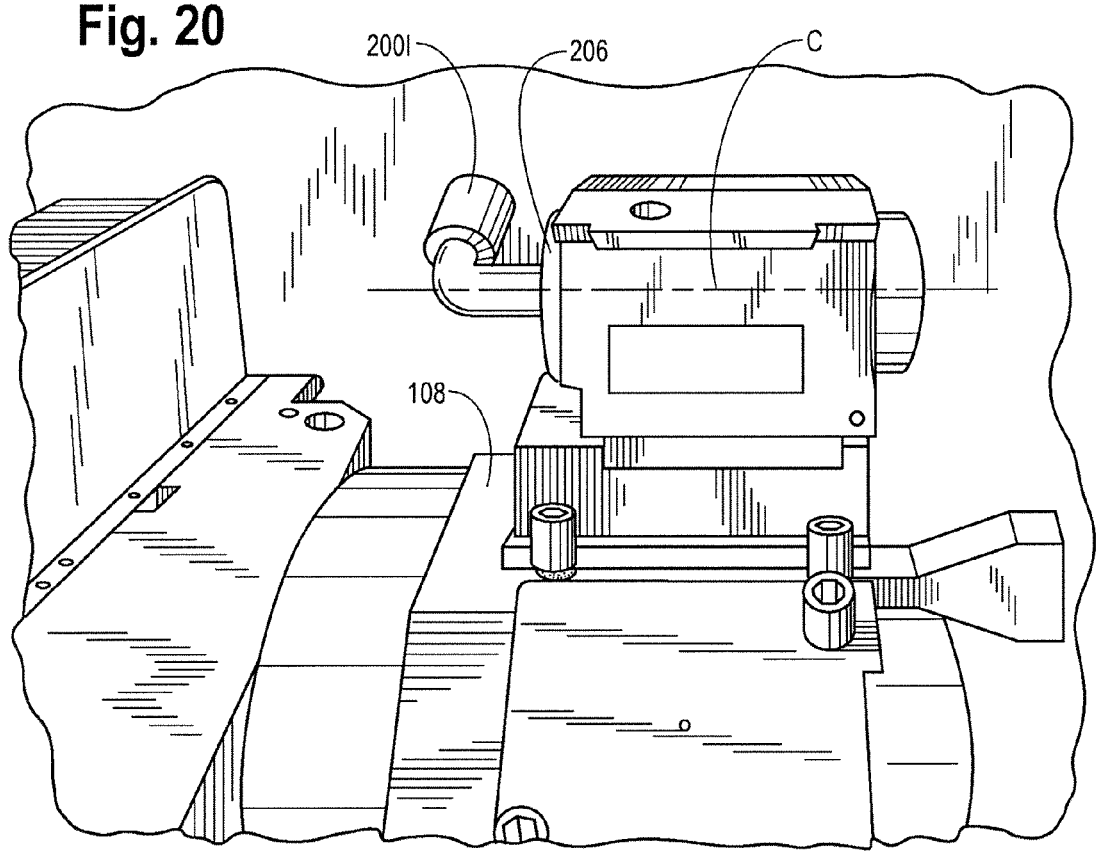
FIG. 20 is a perspective view of an embodiment of a coolant nozzle, illustrating a coolant nozzle in a rotary tool holder, the nozzle being rotatable in a C-axis.
Figure 21:
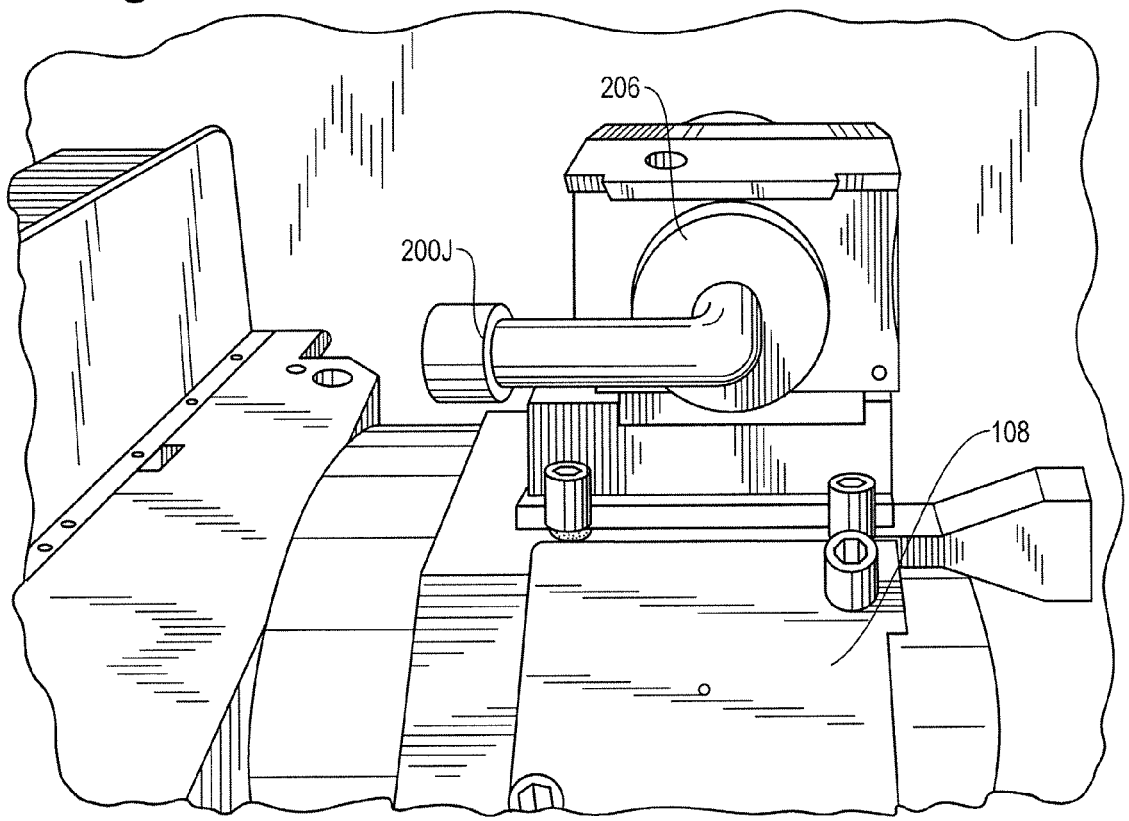
FIG. 21 is a perspective view of an embodiment of a coolant nozzle, illustrating the coolant nozzle in a rotary tool holder, the nozzle being rotatable in a B-axis.

The coolant nozzle may be rotatable about any suitable axis, such as the A-, B-, and C-axes illustrated in FIG. 4. As shown, for instance, in FIGS. 19-21 respectively, the coolant nozzle 200H, 200I, 200J may be rotatable about the A-, C-, or B-axes. Rotation is enabled when the coolant nozzle 200H, 200I, 200J is disposed in the operating position of the turret 108, which, in the illustrated embodiment, is at the "top" of the turret 108. Generally, this operating position is the sole position at which coolant flows through a tool holder 206 disposed on the turret 108 and in which the turret motor is positioned to rotate the coolant nozzle. It is contemplated, however, that other operating positions on the turret are possible and that other axes of rotation of the coolant nozzle may be employed. Likewise, the coolant nozzle is shown as extending at a 90° angle relative to the axes of rotation R1, R2, and R3 of the spindle 144, the grinding wheel 202, and the turret 108, respectively, but in other embodiments the coolant nozzle may extend at an oblique angle with respect to the axes of rotation.

Figure 22:
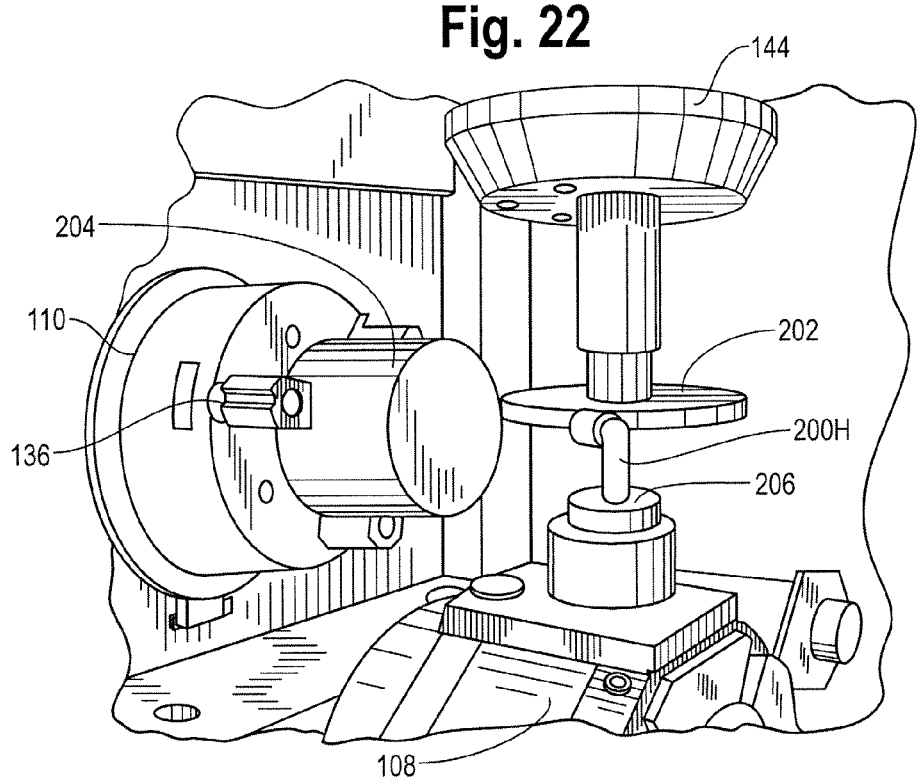
FIG. 22 is a perspective view of a computer numerically controlled machine employing the coolant nozzle illustrated in FIG. 19 in a slot grinding operation.

It is thus seen that various configurations are possible. For instance, with respect to FIG. 22, a slot grinding operation may be employed with the coolant nozzle 200H illustrated in FIG. 19 delivering cooling fluid to impinge upon the grinding wheel 202 as illustrated. Alternatively, as shown in FIG. 23 with regard to the outside diameter rough grinding operation, the coolant nozzle 200I illustrated in FIG. 20 may be employed. More generally, other configurations of the coolant nozzle relative to the grinding wheel 202 and workpiece 204 are possible.

The nozzle may be rotatable about an axis of rotation R4 that may vary depending on the configuration of the rotary holder 206. For example, in the embodiments shown in FIGS. 10-12, the nozzles 200, 200A have an axis of rotation R4 that is in the A-axis of the machine. In the embodiment shown in FIGS. 13-14, the nozzles 200B, 200C each have an axis of rotation that is in the C-axis of the machine. In other embodiments, the nozzle may be rotatable in the B-axis of the machine, such as the nozzle 200J shown in FIG. 21, or on an axis oblique to the A-, B-, and C-axes.

The coolant is supplied under pressure to the nozzle, and, in connection with viper grinding, the coolant is typically supplied under a pressure of 500-1500 psi. As shown in FIG. 24, the tip 210 of the nozzle 200K may take the form of a narrow slit. It is believed in some embodiments that the slit configuration will enable laminar coolant flow, which may be desired in some cases. Such laminar flow can enable spraying coolant from a greater distance, thus avoiding the need to position the nozzle in close proximity to the grinding wheel 202 and/or the workpiece 204. Other nozzle configurations are possible. For instance, the tip may take the form of a surface with plural small holes (not shown). Laminar flow may be possible in other nozzle configurations.

As shown in FIG. 25, the nozzle 200L may be mounted on a guard 212 of the grinding wheel 202. In this embodiment, the grinding wheel 202 may be disposed on the spindle 144 of the machine. The guard 212 and hence the nozzle 200L are stationary with regard to the axis of rotation of the nozzle, i.e., the nozzle, guard, and wheel move together in the machine (although the wheel rotates and hence moves with respect to the nozzle and guard). To maintain a constant coolant contact angle, the workpiece 204 and grinding wheel 202 are moved relative to one another while the guard 212 and nozzle 200L remain stationary with respect to the axis of rotation R2 of the grinding wheel 202.

The machine may (and typically will) include other nozzles for dispensing coolant. Some nozzles may operate under lower pressure (around 100 psi) than the pressures desired for viper grinding. In such cases, the machine may be equipped with plural pumps, one for lower pressure operations and one for higher pressure operations. One suitable high-pressure, high-volume pump is sold under the trademark CHIPBLASTER by Chipblaster of Meadville Pa. In some cases, plural nozzles are provided, one to spray coolant onto the grinding wheel (or workpiece) before the point of contact and one to spray coolant to serve a cleaning function after the point of contact. For viper grinding, a second cleaning coolant nozzle may be used but typically is not required.

The invention has been exemplified with respect to a grinding wheel, but other tools alternatively may be employed. Grinding wheels other than disc-shaped wheels are contemplated. Similarly, the invention has been exemplified with respect to the machine shown in the figures, but other machine configurations are possible. In some embodiments, a machine may be equipped with plural turrets, and in some embodiments one or more turrets may have a Y-axis component of motion.

The maintenance of a constant coolant contact angle or time to interface is deemed to be constant within the limits of performance of the machine. In some embodiments, the maintenance of a constant time to interface is accomplished by maintaining a constant time within a predetermined tolerance range, such that the nozzle is moved relative to the wheel or workpiece in intermittent steps. Similarly, the maintenance of a constant coolant contact angle may be accomplished by maintaining a constant angle within a predetermined tolerance range, such that, again, the nozzle is moved relative to the wheel workpiece in intermittent steps All references, including publications, patent applications, and patents, cited herein are hereby incorporated by reference. Any description of certain embodiments as "preferred" embodiments, and other recitation of embodiments, features, or ranges as being preferred, is not deemed to be limiting, and the invention is deemed to encompass embodiments that are presently deemed to be less preferred. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention.

The invention claimed is:

1. An apparatus comprising:
   a first holder for retaining a workpiece;
   a second holder for retaining a tool configured to remove material from said workpiece;
   each of said first and second holders comprising one of a first chuck, a second chuck, and a spindle;
   a turret supported independently of the first and second holders and supported for rotation about a turret axis, the turret having plural facets;
   at least one rotary holder rotatably coupled to a selected one of the facets of said turret and configured to rotate about a nozzle axis that is different from the turret axis;
   a coolant nozzle having a nozzle body shape that is one of angled and curved with respect to the nozzle axis, the coolant nozzle being coupled to the rotary holder and fluidly communicating with a source of pressurized coolant, the coolant nozzle further including a tip portion having a discharge outlet for discharging coolant, said discharge outlet being spaced from the nozzle axis;
   a motor operatively coupled to said rotary holder and configured to rotate said rotary holder about the nozzle axis and relative to said turret;
   a computer control system operatively coupled to said first and second holders, to said motor, and to said turret, said computer control system including a computer readable medium having disposed thereon executable code which, when executed, is configured to:
      cause relative movement of said first holder and said second holder;
      rotate said turret about the turret axis to a coolant operative position;
      operate the motor to rotate the rotary holder about the nozzle axis, which is different from the turret axis, so that the discharge outlet of the coolant nozzle is indexed to a predetermined position; and
      selectively introduce coolant through said coolant nozzle.

2. The apparatus of claim 1, in which the first holder defines a first axis of rotation and the second holder defines a second axis of rotation, and in which the nozzle axis is parallel to one of the first and second axes of rotation.

3. The apparatus of claim 1, in which the first holder defines a first axis of rotation and the second holder defines a second axis of rotation, and in which the nozzle axis is orthogonal to one of the first and second axes of rotation.

4. The apparatus of claim 1, in which the first holder defines a first axis of rotation and the second holder defines a second axis of rotation, and in which the nozzle axis is oblique to the first and second axes of rotation.

5. The apparatus of claim 1, said code being further configured to adjust the relative position of said first holder and said second holder and adjust the position of said coolant nozzle to maintain a constant coolant time interface.

6. The apparatus of claim 1, in which said discharge outlet comprises a slit hole.

* * * * *